United States Patent [19]
White

[11] Patent Number: 5,842,613
[45] Date of Patent: Dec. 1, 1998

[54] EYEGLASS HOLDER

[76] Inventor: Matthew C. White, 1161 Buchon, San Luis Obispo, Calif. 93401

[21] Appl. No.: 665,439

[22] Filed: Jun. 18, 1996

[51] Int. Cl.$^6$ ....................................................... A45F 3/14
[52] U.S. Cl. .......................... 224/250; 224/251; 224/254; 224/255; 206/5; 206/478; 24/3.1; D3/266
[58] Field of Search .................................... 224/250–255, 224/267, 904, 907, 914, 918; 248/902; 206/5, 6, 478, 477, 480, 493; 24/3.1; D3/266

[56] References Cited

U.S. PATENT DOCUMENTS

| | | | |
|---|---|---|---|
| Re. 30,899 | 4/1982 | Kallman ......................................... | 24/3 |
| 2,067,386 | 1/1937 | Frowenfeld et al. .................... | 206/478 |
| 2,226,409 | 12/1940 | Patterson et al. ....................... | 206/478 |
| 2,528,501 | 11/1950 | Davis ...................................... | 224/232 |
| 2,645,340 | 7/1953 | Dow ........................................ | 206/478 |
| 3,369,723 | 2/1968 | Saari et al. .............................. | 224/250 |
| 4,452,354 | 6/1984 | Tabachnick ................................ | 206/5 |
| 4,771,515 | 9/1988 | Guarro ......................................... | 24/3 |
| 4,809,406 | 3/1989 | Tsai ........................................ | 248/902 |
| 4,894,887 | 1/1990 | Ward, II ..................................... | 24/3 |
| 5,000,410 | 3/1991 | Beavers ............................... | 248/205.3 |
| 5,033,612 | 7/1991 | Bivins ........................................ | 206/5 |
| 5,046,696 | 9/1991 | Lee ..................................... | 248/309.1 |
| 5,351,098 | 9/1994 | McDaniels et al. ..................... | 351/112 |

*Primary Examiner*—David J. Walczak
*Assistant Examiner*—Timothy L. Maust
*Attorney, Agent, or Firm*—Leo F. Costello

[57] ABSTRACT

An eyeglasses holder including an elongated flat plate having upper and lower ends, front and back sides, and a slot adjacent to its lower end extending therethrough from the front side to the back side and including legs joined by a bight and with the legs defining a post therebetween and terminating in a pair of holes closely adjacent to the lower end of the plate. A hanger is attached to the back side of the plate at the upper end thereof for hanging the plate in a pendent position on the pocket of an article of clothing, on the dashboard or interior of a vehicle, on a piece of furniture, or on another convenient support. A flexible O-ring of resiliently flexible material is releasably extended through the bight and thence slidable along the legs into the holes where it is wrapped around the post. The diameter of the ring is greater than the distance between the holes whereby the ring has a short arcuate segment engaging the post and a long arcuate or elliptical segment projecting outwardly from the post from the front side of the plate. The long segment is thus held outwardly from the plate in a position to receive the temple of a pair of glasses but is resiliently bendable downwardly under the weight of a pair of glasses when the temple thereof is inserted into the long segment. The O-ring thereby provides a soft, dependable support for the glasses.

20 Claims, 4 Drawing Sheets

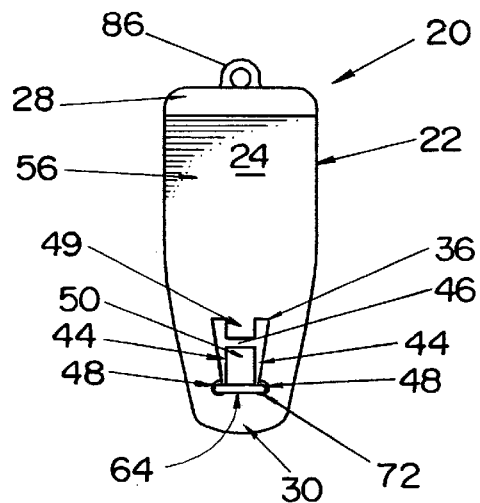
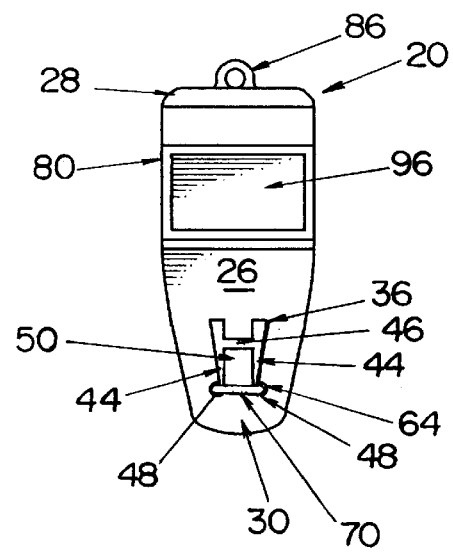
Fig. 3          Fig. 4
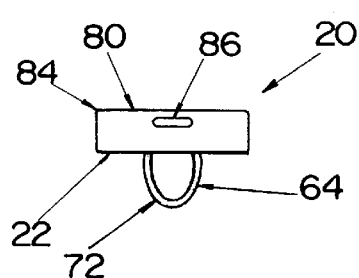
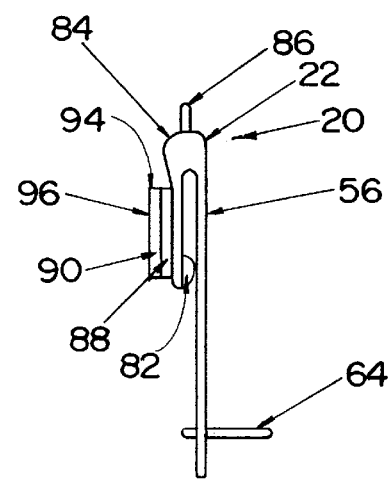
Fig. 5          Fig. 6

EYEGLASS HOLDER

FIELD OF THE INVENTION

The present invention pertains to an eyeglass holder and more particularly to a hanger for supporting a pair of eyeglasses on the exterior of a pocket of an article of clothing, on the interior surfaces of a vehicle, on a piece of furniture, and on numerous other convenient supports.

It is well known that eyeglasses must be both protected and conveniently accessible to a wearer when the glasses are not being worn, and various devices have been developed for this purpose. Eyeglass cases clearly provide the maximum protection, but they lack convenient accessibility in many circumstances. Accordingly, accessories have been suggested for supporting a pair of glasses on a person, on a person's clothing, on the dashboard of an automobile, or on some other fixture convenient to the wearer.

Examples of such eyeglass holders in the patented art include those disclosed in U.S. Patents to Tabachnick, U.S. Pat. No. 4,452,354; Ward II, U.S. Pat. No. 4,894,887; Lee, U.S. Pat. No. 5,046,696; and Bivins, U.S. Pat. No. 5,033,612. In addition to the main objective of dependably supporting a pair of glasses, such a holder must be simple of construction, easy to use, and inexpensive to manufacture. Also, it is preferable that the holder provide a soft flexible support rather than a hard rigid support. The known holders do not provide all of these characteristics.

Moreover, it is deemed advantageous to provide such an eyeglass holder as a give-away for conventions or large meetings where storing unworn glasses can be especially troublesome. To satisfy such a need and to advertise at such meetings, it is thus desirable to provide a simple, dependable eyeglasses holder which provides a soft support for a pair of eyeglasses and which also serves to carry desired advertising indicia.

SUMMARY

An eyeglasses holder is provided which includes an elongated flat plate having upper and lower ends, front and back sides, and a slot adjacent to its lower end extending therethrough from the front side to the back side and including legs joined by a bight, and with the legs defining a post therebetween and terminating in a pair of holes closely adjacent to the lower end of the plate. A hanger is attached to the back side of the plate at its upper end for hanging the plate in a pendent position on the pocket of an article of clothing, on the dashboard or interior of a vehicle, on a piece of furniture, or on another convenient support. A flexible O-ring of resiliently flexible material is releasably extended through the bight and thence slidable along the legs into the holes where it is wrapped around the post. The diameter of the ring is greater than the distance between the holes whereby the ring has a short arcuate segment engaging the post and a long arcuate or elliptical segment projecting outwardly from the post from the front side of the plate. The long segment is thus held outwardly from the plate in a position to receive the temple of a pair of glasses but is resiliently bendable downwardly under the weight of a pair of glasses when the temple thereof is inserted into the long segment. The O-ring thereby provides a soft, dependable support for the glasses but also flexes resiliently upwardly when empty into a convenient position to receive the temple of a pair of glasses.

An object of this invention is to provide a simple, inexpensive device for holding a pair of eyeglasses in a pendent position.

Another object is to provide an eyeglass holder which facilitates insertion and removal of a pair of eyeglasses.

Yet another object is to provide a soft support for engaging and supporting a pair of eyeglasses in a pendent position.

A further object is to provide an eyeglass holder that is inexpensive to manufacture.

A still further object is to utilize an eyeglass holder to carry advertising indicia.

Another object is to provide an eyeglass holder that can be supported in various ways, such as on the pocket of an article of clothing, on the dashboard or interior of a vehicle, on a piece of furniture, on a hook, or the like.

Another object is to support the eyeglass holder in such a way that the eyeglasses can be removed from the holder without removing the holder from its support.

These and other objects, features and advantages of the present invention will become apparent upon reference to the following description, accompanying drawings, and appended claims.

DESCRIPTION OF THE DRAWINGS

FIG. 3 is a front elevation of the eyeglass holder.

FIG. 4 is a rear elevation of the eyeglass holder.

FIG. 5 is a top plan of the eyeglass holder.

FIG. 6 is a side elevation of the eyeglass holder showing the ring extended in a position to receive a pair of eyeglasses.

Figure 1:
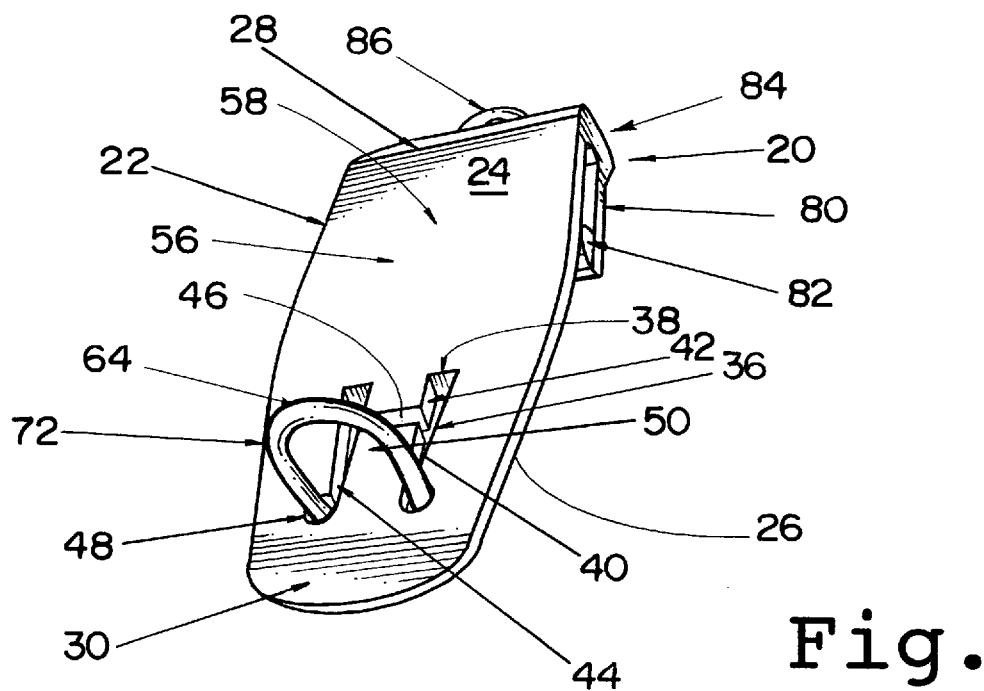
FIG. 1 is a front isometric view of an eyeglass holder in accordance with the present invention.
Figure 2:
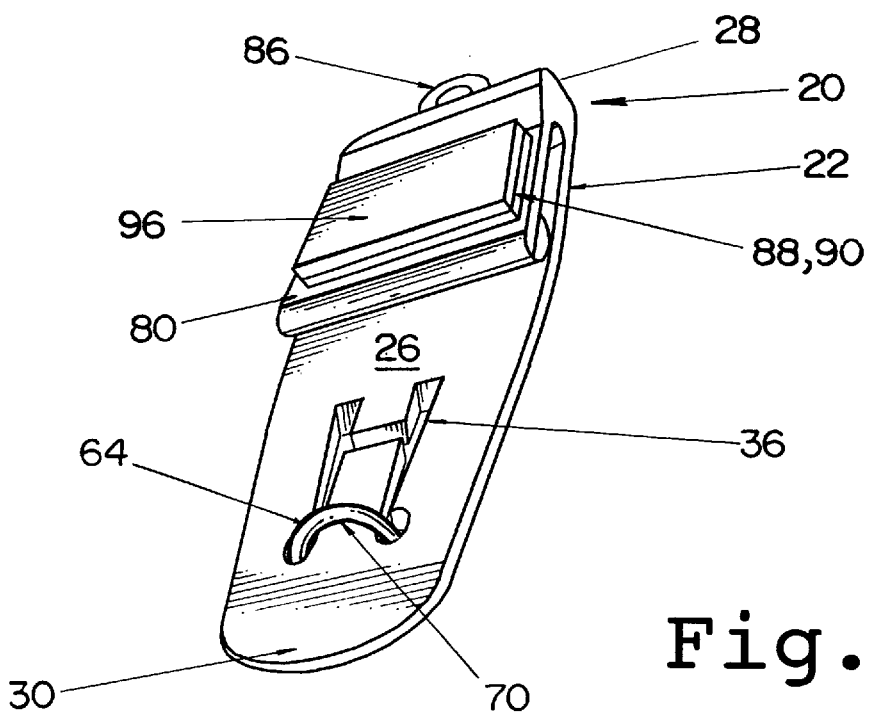
FIG. 2 is a rear isometric view of the eyeglass holder.

With reference with FIGS. 1 through 9, an eyeglass holder in accordance with the present invention is identified by the numeral 20. The holder includes an elongated relatively thin flat front plate 22 which has a front side 24, a rear side 26, an upper end 28, and a lower end 30. With particular reference to FIG. 3, the plate preferably has a generally rectangular upper portion and a tapered lower portion. It is to be understood, however, that the shape of the plate may vary and is not important to the invention.

Figure 7:
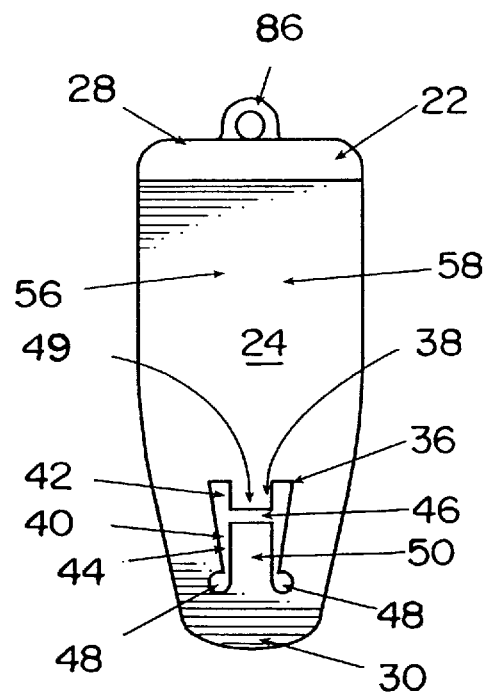
FIG. 7 is a front elevation of the eyeglass holder with the ring removed.

The lower portion of the front plate 22 has an H-shaped slot 36 (FIG. 7). This slot includes upper and lower U-shaped portions 38 and 40 respectively having upper and lower legs 42 and 44 joined by a common bight 46. The legs of the slot taper from their upper ends to their lower ends which terminate in holes 48 each having a diameter slightly larger than the narrowest width of the lower legs of the slot. Also, the legs define upper and lower posts 49 and 50. The front plate also includes an advertising area 56 on the front side 24 of the upper portion of the plate. This area is available for advertising indicia indicated at 58, as by screen printing, hot stamping or pad printing methods.

Figure 8:
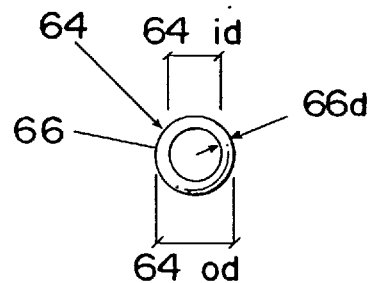
FIG. 8 is a plan view of the ring incorporated in the eyeglass holder of this invention.
Figure 9:
FIG. 9 is an edge view of the ring of FIG. 8.

The eyeglass holder 20 also includes an O-ring 64 (FIGS. 8 and 9) which is made of resiliently flexible material such as a suitable rubber or plastic and preferably resistant to ultraviolet light. The ring is circular when unstressed, as shown in FIG. 8, and thus has an outside diameter 64od and an inside diameter 64id. The ring is formed of a strand 66 of such resiliently flexible material and the strand has an outside diameter 66d. The ring may be provided in different sizes, that is, strand diameters and ring diameters, as well as different colors. The outside diameter of the strand is slightly less than the vertical dimension or width of the bight 46.

The O-ring 64 is assembled with the front plate 22 by inserting the ring edgewise into the bight 46 until the ring is aligned with the posts 49 and 50. Thereupon, the ring is slid down the lower legs 44 of the slot 36 and forced into the holes 48. The diameter 66d of the strand 66 is greater than the width of the legs 44 at their narrowest widths, but the resilient compressibility of the ring allows the ring to be slid through the legs and into the hole. Moreover, the diameter of the strand is approximately the same as the diameter of the holes so that the ring can be slid forwardly and rearwardly relative to the front plate 22. At the same time, however, the narrowness of the lower legs 44 adjacent to the holes essentially locks the ring in the holes unless it is manually forced out.

The H-shape of the slot 36 is useful in the following manner. When the ring 64 is in the holes 48 but is being lifted through the lower legs 44 by pulling upwardly on the forward segment 72, the upward pulling force causes the ring to slide into the upper legs 42 and be captured by the upper post 49. Otherwise, without the upper U-shaped portion, the pulling force might cause the ring to be pulled through the bight and become separated from the plate 22.

Furthermore, it is significant to note that the outer diameter 64od of the ring 64 is greater than the distance between the holes 48. Thus, with the ring surrounding the lower post 50 and positioned within the holes, the ring is slightly compressed into a generally elliptical shape, as best shown in FIGS. 1 and 5. As such, the ring provides an inner arcuate segment 70 (FIGS. 2 and 4) engaging and adjacent to the post 50 and an outer generally elliptical arcuate segment 72 (FIGS. 1 and 3) which projects forwardly from the plate 22. It will thus be understood that because of the described relationship, the plate supports the ring in a generally perpendicular position relative to the plate (FIGS. 1 and 6) when there is no downward force applied to the ring. On the other hand, as will be seen, the ring is resiliently flexible and can be bent downwardly.

The holder 20 (FIGS. 1, 2, 4, and 6) also include a rear flange 80 which is secured to or integral with the upper end 28 of the plate 22 and extends downwardly in spaced relation to the rear side 26 of the plate approximately half the length of the upper portion of the plate. A rib 82 is secured to the inside lower edge of the flange and is spring-pressed into engagement with the rear side 26 of the front plate because of the resilient connection of the flange to the plate. That is, the upper portion of the plate, the flange, and the rib form a clip 84 so that a fabric, for example, can be forced between and grasped by the rib and the plate.

An eyelet 86 extends upwardly from the flange 80 and provides a hole for receiving a suitable hanger, not shown, on which the holder 20 can be suspended. Also, an inner VELCRO pad 88 is secured to the rear surface of the flange 80, and an outer VELCRO pad 90 is releasably attached to the inner Velcro pad. In addition, the outer VELCRO pad has a rear adhesive surface 94, and a removable peeling 96 is adhered to this adhesive surface. Accordingly, the subject holder 20 provides four different ways to support the holder, namely, the eyelet 86, the VELCRO pad 88, the adhesive surface 94, and the clip 84.

Both the plate 22 and the flange 80 are molded of a suitable plastic, preferably a polycarbonate material and in various colors. For simplicity and economy of manufacture, the plate and the flange are preferably molded separately and then joined, but they could be made integral. Also, by providing a separate plate and ring, instead a molded, integral plate and ring, several advantages are achieved. First, the manufacturing cost, that is the molding cost, is reduced notwithstanding the need for separate assembly of the plate and ring. Secondly, if the ring were a part of the mold with the plate, the heat would damage the ring. Thirdly, as a separate piece, the ring can be varied in size to suit eyeglasses of different sizes and in color to suit different tastes. Fourth, the ring can be changed if necessary to correct defects.

OPERATION

Figure 10:
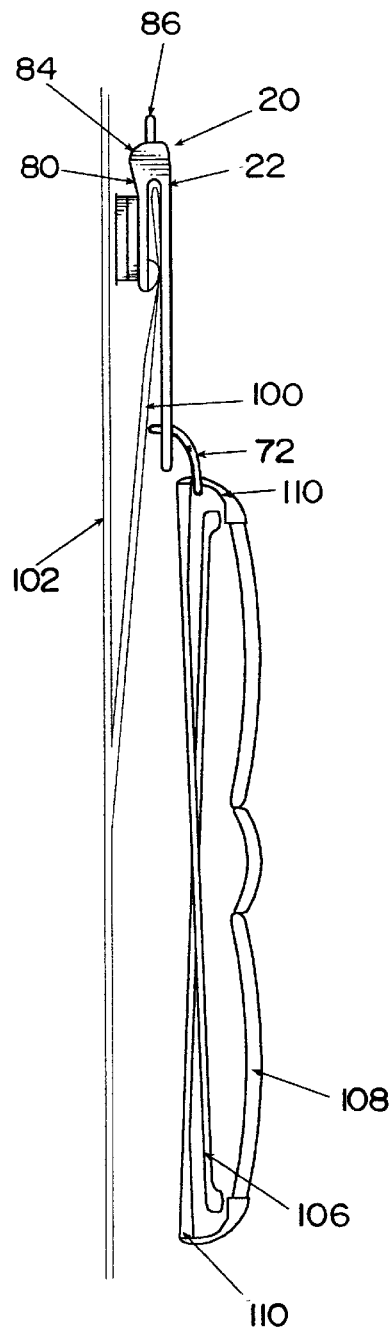
FIG. 10 is a fragmentary view of a pocket in a garment showing the eyeglass holder of the present invention clipped to the pocket and also showing a part of eyeglasses supported from the hanger.
Figure 11:
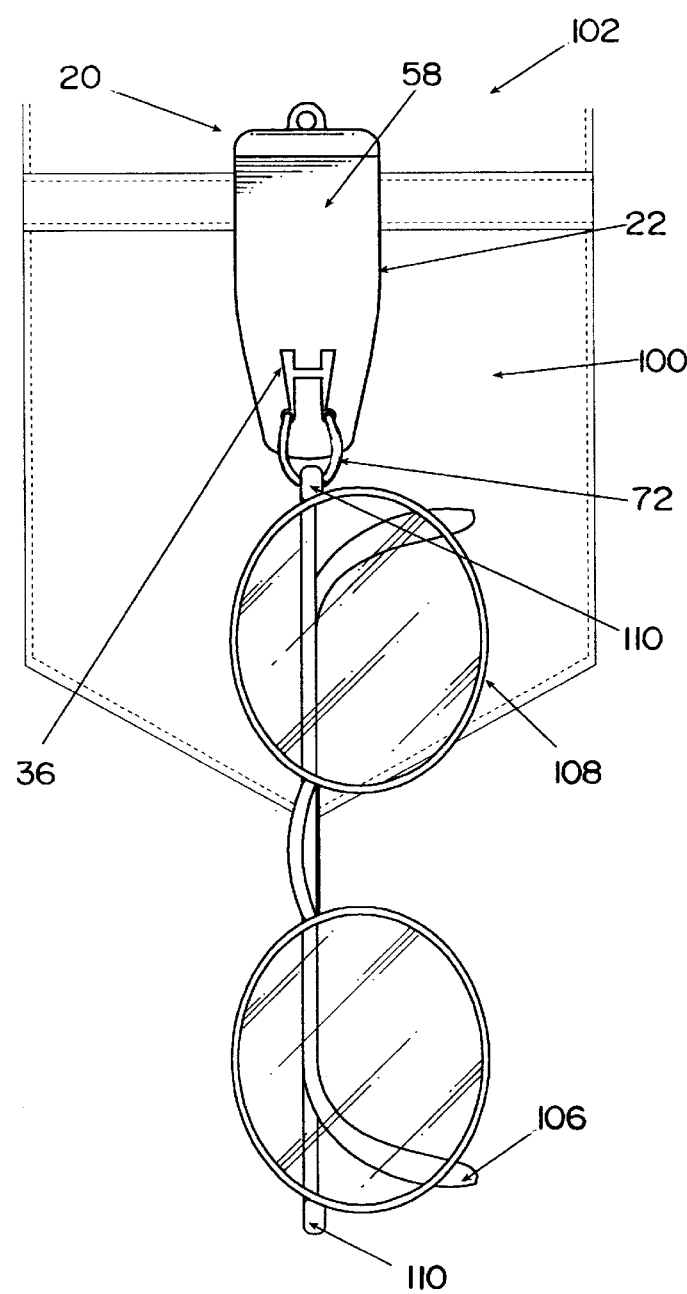
FIG. 11 is a fragmentary front view of the garment and pocket of FIG. 10, showing the eyeglass holder and eyeglasses supported as in FIG. 10.

As an example of use, with particular reference to FIGS. 10 and 11 and with the ring 64 assembled with the plate 22, the holder 20 may be attached to the pocket 100 of a garment 102 by forcing the upper edge of the pocket between the rib 82 and the front plate 22 until the juncture of the front plate and the flange rest on the upper edge of the pocket. In this position, as shown in FIG. 10, the front plate 22 hangs downwardly on the exterior of the pocket, and the outer segment 72 of the ring projects forwardly from the plate in a loading position generally perpendicular to the plate, that is a substantially horizontal position, as shown in FIG. 6. One of the temples 106 of a pair of eyeglasses 108 is then inserted in the ring 64, and the hinge 110 of the glasses is rested on the ring. The weight of the glasses causes the ring to bend downwardly so that the glasses are supported by the holder just beneath the plate. It is to be noted that the ring provides a soft support for the glasses while at the same time dependably holding the glasses. That is, even if the wearer bends over, the glasses will swing on the ring which is free to flex and move relative to the plate so that in any such bent-over position, the glasses are always supported in a pendent position from the plate. Furthermore, the temple cannot slip out of the ring so there is no danger of the glasses becoming separated from the plate, and the holder cannot separate from the wearer's pocket because of the clip 84.

When the glasses 108 are removed from the ring 64, the ring 64 resiliently flexes back into the loading position shown in FIGS. 1 and 6. In this way, the ring remains ready for convenient insertion of a temple 106 of a pair of glasses 108 into the ring. It is to be understood that the ring may not flex back into a perfectly perpendicular or horizontal position, as shown, but the plane of the ring will flex back so that its attitude will be close enough to horizontal as to facilitate easy insertion of the temple. Although the ring is extremely durable, the ring can be removed from the plate and replaced if necessary. Also, as above noted, rings of different colors can be utilized to enhance the appearance of the holder.

As previously noted, the holder 20 serves as an advertising medium in that advertising indicia 58 can be applied to the area 56 on the upper portion of the front plate 22. Thus, because of this simple inexpensive construction, the holder is ideally suited as a give-away item for those attending conventions or other large meetings while at the same time serving as a method of advertising either a particular organization, a company, or the name of the individual.

Although a preferred embodiment of the present invention has been shown and described, various modifications, substitutions and equivalents may be used therein without departing from the spirit and scope of the invention. Accordingly, it is present invention has been present invention has been described by way of illustration and not limitation.

What is claimed is:

1. An eyeglasses holder for supporting eyeglasses on a supporting article, said eyeglasses having temples attached to the glasses by hinges, comprising:

an endless flexible ring of resilient material having a uniform cross-section throughout its circumference and being circular and disposed in a generally flat plane when unstressed but being resiliently flexibly movable out of said plane when stressed, said ring circumscribing an opening adapted to receive the temple of a pair of eyeglasses;

means for supporting the ring, and means for hanging the supporting means in a pendent position on such a supporting article, said supporting means mounting the ring so that said plane of the ring projects outwardly from the supporting means when the latter is in said pendent position and so that the ring is free to flex up and down relative to the supporting means but resiliently resists movement in all directions, whereby the ring can be resiliently moved from a glasses-receiving position with the ring projecting outwardly and the opening of the ring directed generally upwardly so that the temple of a pair of eyeglasses can be inserted downwardly into said opening, to a glasses-supporting position wherein the hinge of the glasses attached to the temple in the opening can bear downwardly on the ring and cause the ring to flex downwardly with the plane of the ring angled downwardly from said glasses-receiving position and wherein the eyeglasses can hang downwardly from the ring while being loosely supported by the ring and without tight retention by the ring, said ring having means that resiliently returns the ring toward the glasses-receiving position when a pair of eyeglasses is removed from the ring, said supporting means being interconnected with the ring to limit movement of the ring up and down and outwardly away from the supporting means.

2. An eyeglass holder for supporting eyeglasses on a supporting article comprising:

a flexible ring of resilient material adapted to receive the temple of a pair of eyeglasses, said ring being of uniform cross-section throughout its circumference and being circular when unstressed, means for supporting the ring for resilient movement in free space from a glasses-receiving position wherein the temple of a pair of eyeglasses can be inserted downwardly into the ring to a glasses-supporting position wherein the ring is resiliently flexed downwardly when the temple of a pair of eyeglasses is inserted therein and the eyeglasses hang downwardly from the ring without being tightly grasped by the ring, means for hanging the supporting means in a pendent position on such a supporting article, and the supporting means squeezing the ring so that it has an arcuate segment projecting outwardly from spaced inner portions and so that the arcuate segment is resiliently movable up and down in free space relative to the inner portions in order to loosely receive the temple of a pair of glasses and thereby to support the glasses, said supporting means also limiting outward movement of the ring relative to the supporting means to preclude dislodgment of the ring and glasses from the supporting means.

3. An eyeglass holder comprising:

a flexible ring of resilient material adapted to receive the temple of a pair of eyeglasses, means for supporting the ring for resilient movement from a glasses-receiving position wherein the temple of a pair of eyeglasses can be inserted downwardly into the ring to a glasses-supporting position wherein the ring is resiliently flexed downwardly when the temple of a pair of eyeglasses is inserted therein and the eyeglasses hang downwardly from the ring, means for hanging the supporting means in a pendent position, wherein the supporting means is a flat plate having a pair of holes therein, wherein the ring is looped through the holes and projects outwardly from the plate, and wherein the plate engages the ring and holds it in an outwardly projecting position from the plate when no glasses are supported in the ring but allows the ring to flex downwardly from the plate when glasses are supported therein.

4. The eyeglasses holder of claim 3, wherein the plate has a U-shaped slot which has leg portions terminating in said holes and a bight portion interconnecting the leg portions, said holes having a diameter slightly larger than the diameter of the ring, each of said leg portions having a width slightly less than the diameter of the ring, and said bight portion having a width greater than the diameter of the ring.

5. The eyeglasses holder of claim 4, wherein the distance between said holes is less than the diameter of the ring in its unstressed condition, wherein the leg portions of the U-shaped slot form a post therebetween, wherein the ring has a short arcuate segment thereof which wraps around the post in engagement therewith and a long arcuate segment that projects outwardly from the plate for receiving the temple of a pair of eyeglasses.

6. The eyeglasses holder of claim 5, wherein the plate has front and back sides, wherein the long arcuate segment projects from the front side of the plate, and wherein the hanging means is on the back side of the plate.

7. The eyeglasses holder of claim 5, wherein the plate has upper and lower ends, wherein the long arcuate segment projects from the lower end of the plate, and wherein the hanging means is on the upper end of the plate.

8. An eyeglass holder comprising:

an elongated thin flat plate having upper and lower ends, front and back sides, and a U-shaped slot adjacent to its lower end extending therethrough from the front side to the back side and including legs joined by a bight, said legs defining a post therebetween and terminating in a pair of holes closely adjacent to the lower end of the plate, said front side having an upper display area above the slot;

a hanger attached to the back side of the plate at the upper end thereof for hanging the plate in a pendent position; and a flexible O-ring of resiliently flexible material releasably extendible through the bight and thence slidable along the legs into the holes where it is wrapped around the post, the diameter of the ring being greater than the distance between the holes whereby the ring has a short arcuate segment engaging the post and a long arcuate segment projecting outwardly from the post from the front side of the plate, said long segment being thereby held outwardly from the plate in a position to receive the temple of a pair of glasses but being resiliently bendable downwardly under the weight of a pair of glasses when the temple thereof is inserted into the long segment of the ring.

9. The eyeglasses holder of claim 8, wherein the ring is circular when unstressed, where in the ring is generally elliptical when wrapped around the post, and where in the long segment of the ring projects downwardly from the lower end of the plate under the weight of a pair of glasses when the temple thereof is inserted into the long segment of the ring.

10. The eyeglasses holder of claim 8, wherein the hanger includes means for resisting upper and downward vertical movement of the plate when the plate is hung in a pendent position.

11. The eyeglasses holder of claim 8, wherein the hanger includes a rearwardly facing VELCRO pad.

12. The eyeglasses holder of claim 8, wherein the hanger is a flange resiliently connected to the upper end of the plate and extending downwardly alongside of the plate, said flange being resiliently biased against the plate whereby the plate and the flange form clip means for releasably grasping therebetween the panel of a pocket in a garment.

13. The eyeglasses holder of claim 8, wherein the hanger includes a rearwardly facing adhesive surface.

14. The eyeglasses holder of claim 8, wherein the hanger has an upwardly extended eyelet.

15. An eyeglass holder for supporting a pair of eyeglasses on a supporting article, said eyeglasses having temples attached to the glasses by hinges, comprising:

a resiliently flexible O-ring of uniform cross-section circumscribing an axis of the ring and having inner and outer segments, and means resiliently flexibly supporting the O-ring along the inner segment thereof on said supporting article so that the outer segment of the ring has inner portions held spaced apart by the supporting means and is disposed in a generally horizontal plane with said axis angled upwardly but can be resiliently flexed in free space up and down and from side-to-side relative to the inner segment to tilt said axis into various attitudes while returning to said generally horizontal plane when the flexing force is removed, whereby the outer segment of the ring is resiliently maintained in a generally horizontal receiving position to receive the temple of a pair of eyeglasses but can flex resiliently downwardly in a pendent position under the weight of the glasses to loosely support the glasses on the mounting member by the hinge that interconnects the temple to the glasses and without being tightly retained by the ring, said O-ring having means cooperating with the supporting means to cause the ring to return toward its receiving position after the weight of the glasses is removed from the ring, said supporting means having means providing interlocking engagement with the inner segment of the ring.

16. An eyeglass holder comprising:

a plate having upper and lower ends, front and back sides, and a pair of spaced holes adjacent to the lower end of the plate, a hanger attached to the plate at the upper end thereof for hanging the plate in a pendent position; and a ring of resiliently flexible material looped through the holes whereby the ring has an arcuate segment projecting freely outwardly in space from inner portions adjacent to the front side of the plate, said segment being held outwardly from the plate by the engagement of said inner portions with the plate in a position to receive the temple of a pair of glasses but without the glasses being supported therein whereby the segment can be resiliently bent downwardly alongside the plate under the weight of a pair of glasses when the temple thereof is inserted into the arcuate segment of the ring thereby to support the glasses without constricting them.

17. The eyeglass holder of claim 16 wherein the diameter of the ring is greater than the distance between the holes.

18. The eyeglasses holder of claim 16, wherein the ring is an O-ring having a round cross-section.

19. The eyeglasses holder of claim 1, wherein the supporting means is a plate having a pair of holes and a post between the holes; and wherein the ring is looped through the holes and around the post, whereby said limitation of outward movement is caused by the engagement of the ring with the post.

20. The eyeglass holder of claim 2, wherein the supporting means is a plate having a pair of holes and a post between the holes; and wherein the ring is looped through the holes and around the post, whereby said limitation of outward movement is caused by the engagement of the ring with the post.

* * * * *